N. WARE.
STEERING MECHANISM FOR TRACTORS.
APPLICATION FILED AUG. 18, 1919.
1,334,421.
Patented Mar. 23, 1920.
2 SHEETS—SHEET 1.
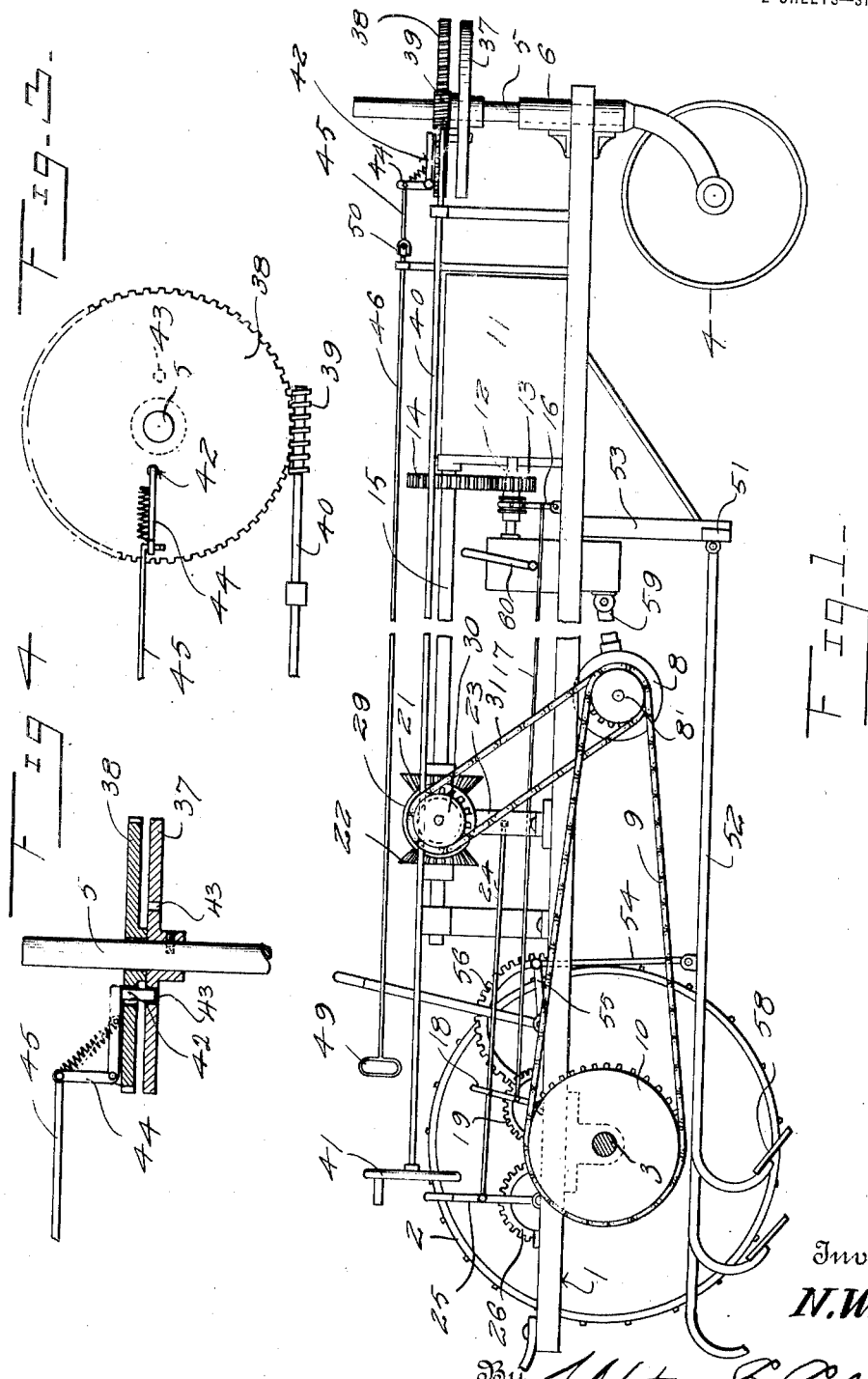
Inventor
N. Ware
By Watson E. Coleman
Attorney

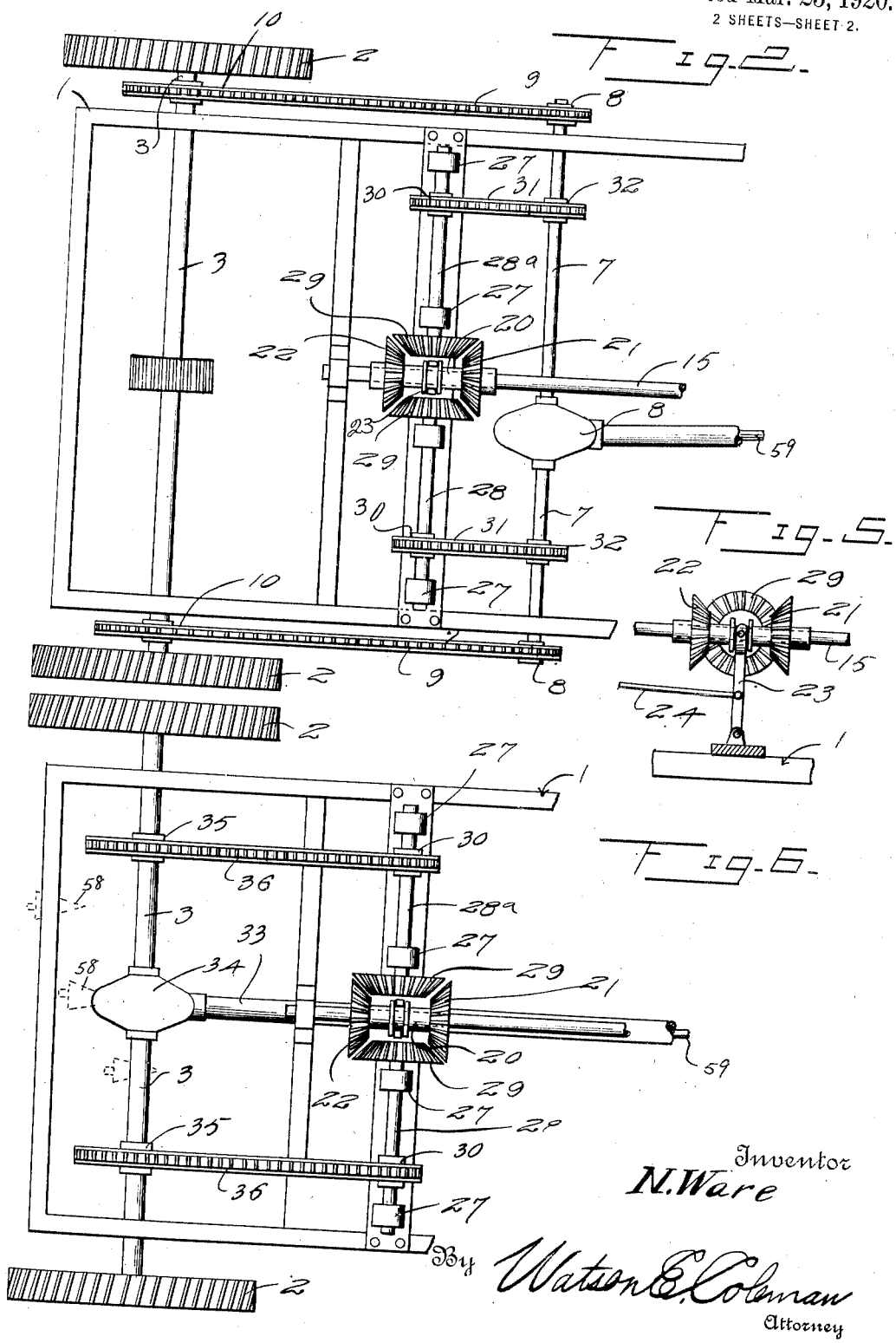

UNITED STATES PATENT OFFICE.

NELSON WARE, OF MILBANK, SOUTH DAKOTA.

STEERING MECHANISM FOR TRACTORS.

1,334,421.   Specification of Letters Patent.   Patented Mar. 23, 1920.

Application filed August 18, 1919. Serial No. 318,274.

*To all whom it may concern:*

Be it known that I, NELSON WARE, a citizen of the United States, residing at Milbank, in the county of Grant and State of South Dakota, have invented certain new and useful Improvements in Steering Mechanism for Tractors, of which the following is a specification, reference being had to the accompanying drawings.

This invention relates to tractors such as are used in agricultural operations, and particularly to tractors carrying plows or cultivators.

One of the draw-backs to the use of the ordinary tractor in handling plows or like cultivating appliances is that it takes considerable room for a tractor to turn so that a great deal of ground is left uncultivated in each corner of the field, and the general object of this invention is to provide means whereby a tractor may make a very short turn so that every foot of ground may be plowed or cultivated right into the fence corners so that the field will not have to afterward be finished by team drawn plows or cultivators.

A further object of the mechanism is to provide means whereby the tractor may be turned very short so that the operator can readily guide the tractor in any direction.

A further object is to provide a short turning steering mechanism which may be applied to any ordinary tractor.

Another object is to provide means whereby the power of the tractor engine may be used to secure a short turning movement.

A further object is to provide a construction of this character in which a forward steering wheel is used and which may be operated in the usual manner under ordinary circumstances, and provide means whereby this forward steering wheel may be disconnected so as to act as a caster wheel when it is desired to make a short turn, and to provide means whereby one of the driving traction wheels of the machine may be rotated in one direction and the other rotated in an opposite direction in order to turn the machine.

Other objects will appear in the course of the following description.

My invention is illustrated in the accompanying drawings, wherein:—

Figure 1 is a side elevation with one of the rear traction wheels removed and the other shown in section, showing my invention applied to a tractor;

Fig. 2 is a fragmentary top plan view of a tractor with my mechanism applied thereto;

Fig. 3 is a fragmentary top plan view of the steering wheel actuating means;

Fig. 4 is a diametrical section of the construction shown in Fig. 3;

Fig. 5 is a side elevation of the power operated steering gear wheels;

Fig. 6 is a like view to Fig. 2 but showing a modified arrangement of the driving mechanism on a tractor.

Referring to these drawings, it will be seen that I have illustrated an ordinary construction of tractor provided with a frame comprising members 1 arranged in any suitable base, this frame being supported at its rear end upon traction wheels 2 mounted upon shaft sections 3. The forward end of the frame is provided with a steering wheel 4 mounted as a caster wheel and having a vertically extending axis or shaft 5 disposed in a suitable vertical bearing 6 carried by the frame of the machine. In Fig. 2 I have illustrated the driving connections to the traction wheels 2 as comprising laterally disposed shaft sections 7 connected to each other by means of a differential 8 inclosed in the usual housing and connected to the usual driving shaft of the motor, these shaft sections 7 each carrying sprocket wheels 8 at their extremities connected by sprocket chains 9 to sprocket wheels 10 mounted upon the shaft sections 3 of the traction wheels.

By this means power is ordinarily transmitted to the traction wheels to drive the machine forward or backward. The motor 11 is of the usual internal combustion type, and its crank shaft 12 is connected in any suitable manner to the driving shaft of the differential 8. Carried upon the shaft 12 is a gear wheel 13 which is rotatable with the shaft and longitudinally shiftable therealong and meshes with a gear wheel 14 carried on an auxiliary driving shaft 15. The gear wheel 13 is shifted upon the shaft 12 by means of a shipper lever 16 connected by a rod or other suitable connection 17 to a lever 18 mounted upon the frame of the machine adjacent the driver's seat and operating over a quadrant 19.

The shaft 15 has splined to it a longitudinally shiftable sleeve 20 which carries upon it the opposed beveled gear wheels 21 and 22. This sleeve 20 is shifted by means of a lever 23 which is pivoted at its lower end upon the frame and is connected above its pivot to a connecting rod or other equivalent member 24 which extends to a lever 25 operating on a quadrant 26 and disposed adjacent the driver's seat. This is a push and pull connection so that by operating the lever 25, this sleeve 20 and the gear wheels 21 may be shifted on the shaft 15.

Mounted upon the frame of the machine in bearings 27 are the shaft sections 28 and 28$^a$ extending transversely of the machine and which, at their inner ends, carry relatively large beveled gear wheels 29 coacting with the beveled gear wheels 21 and 22. These shafts 28 each carry a sprocket wheel 30 which, in the form of the invention shown in Fig. 2, is connected by a sprocket chain 31 to a corresponding sprocket wheel 32 mounted upon the shaft sections 7 so that power will be taken from the shaft sections 28 and 28$^a$ to operate the traction wheels. It will be obvious now that when the beveled gear wheel 21 is engaged with the gears 29, one of said gears and the corresponding shaft 28 will be rotated in one direction, while the other gear wheel and the corresponding shaft 28$^a$ will be rotated in the opposite direction, thus causing one traction wheel to rotate in one direction and the other in the other direction, to thus cause a relatively short turning of the machine.

In Fig. 6 I illustrate a slightly modified form of gearing, wherein the shaft sections 3 are connected to a driving shaft 33 through a differential 34 so that the traction wheels are rotated directly in contradistinction to the construction shown in Fig. 2, where the traction wheels are rotated through sprocket chains engaging the shaft 7. It will be understood that the shaft 7 is the equivalent of the shaft 3. In the last named case, the shaft sections 3 carry upon them sprocket wheels 35 which may be connected by sprocket chains 36 to the sprockets 30 on the shaft sections 28 and 28$^a$. Here, again, the beveled gears 21 and 22 may be shifted into position where neither will engage the gear wheels 29 or may be shifted so as to engage one or the other of the beveled gear wheels 21 and 22 with the gear wheels 29 and thus cause the rotation of one traction wheel in one direction and the other in the opposite direction.

Provision must be made for steering the tractor under ordinary circumstances by rotating the steering wheel 4 in a horizontal plane when the power operated steering mechanism is out of use but for releasing this steering wheel 4, if desired, to permit this wheel to act as an ordinary caster wheel when the power operated steering mechanism is in use. To this end I have illustrated a disk 37 as mounted upon the shaft 5 of the forward steering wheel and rotating therewith, and a disk 38 as loosely mounted upon the steering shaft 5 and adapted to rotate independently thereof. This disk 38 is engaged by a worm 39 or any other suitable mechanism whereby the disk 38 may be rotated, this worm 39 being mounted upon a shaft 40 which extends rearward to the rear end of the frame, is mounted in suitable bearings, and is connected to the tiller wheel 41. To the end that the rotation of the disk 38 shall cause a rotation of the disk 37 and a corresponding rotation of the shaft 5, I mount upon the disk 38 a latch 42 and provide the disk 38 and the disk 37 with registering openings 43. When these openings are brought into coincidence, the latch 42 will be dropped or shifted so that it will positively engage the two disks for unitary rotation. When, however, the latch 42 is shifted to disengage the disks, the disk 37 may rotate independently of the disk 38. I have shown the latch 42 as being a bolt mounted upon an arm 44 pivoted to the face of the disk 38 and connected by a rod or like device 45 to a push and pull rod 46 supported in suitable bearings or guides and extending rearward to a position adjacent the driver's seat, where it is provided with a handle 49. The rods 45 and 46 are flexibly connected to each other, at 50.

By this mechanism, the bolt 42 may be lifted from its engagement with the two disks, and in this case the steering wheel 4 is disengaged from the tiller wheel 41 and the steering wheel, therefore, will turn on its axis like a caster wheel following the direction of movement given to the forward end of the frame. When the machine is to be sharply turned, the steering wheel 4 is disconnected, as before remarked, from the tiller and one or the other of the gear wheels 21 and 22 is connected to the gear wheels 29 so that power for turning movement is applied to the rear end of the frame, thus swinging the tractor sharply around with the rear end of the tractor as a caster. In this case, the steering wheel 4 trails and takes a position which is angular to the longitudinal axis of the machine and keeps this position until the machine is once more in position to move straight ahead. Then, of course, the wheel swings back into a position parallel to the longitudinal axis of the machine and the bolt 42 can once more drop into the two coinciding openings and the steering wheel is once more adapted to be operated by the tiller. It will be noted that the tiller 41, the handle 49, the lever 18, and the lever 25 are all disposed at the rear end of the frame adjacent the driver's seat. The plows, cultivators, or other like ground engaging implements are carried upon a beam 52 which is pivoted at its forward end upon the downwardly extending member 53 carried by the frame and suitably braced, and this beam is raised or lowered by means of a link 54 connected to a bell crank lever 55, one arm of which extends upward and forms a handle and operates over a quadrant 56.

The draw bar 51 to which the plow beam 52 is pivotally connected is located far enough forward as to allow the leading plow or cultivator share 58 to be located with its point underneath the exact center of the driving axle. When the power operated steering means is used, the tractor turns upon an axis extending vertically downward through the middle of the driving axle, and it is at this point that the leading plow share or tool should be disposed.

As illustrated, the crank shaft 12 of the motor is connected to the shaft 59, transmitting power to the differential 8, by a clutch 60 which is of ordinary form, and by shifting this clutch, the ordinary or regular driving mechanism may be stopped and the machine brought to a standstill, with the motor still in operation.

In plowing with a tractor equipped with this short turning mechanism, and plows or other ground engaging elements located as explained, the operator can guide the tractor in any direction through the tiller 41, as before explained. When the tractor arrives at the end of a field or furrow, the clutch 60 is released. The motor is still in operation with the tractor standing still. The operator pulls the rod 46 back, which pulls back on the bell crank levers 44 and withdraws the bolt or latch 42 from the opening 43 in disk 37. This leaves the caster wheel 4 free to turn in any direction whatever, as the operator has now no control of it through the steering mechanism. The plows are raised out of the ground by means of the lever 54 and lever 18 is pushed forward, causing the gear wheel 13 to mesh with gear wheel 39, thus transmitting power to the shaft 15 and to the gear wheels 21 and 22. By shifting the lever 25 in one direction or the other, one or the other of these gear wheels 21 and 22 may be shifted into engagement with the gear wheels 29, thereby causing the shaft section 28 to rotate in one direction and the shaft section 28ᵃ to rotate in the opposite direction. Power thus transmitted to the shaft sections 28 and 28ᵃ will be transmitted to the shaft section 7, the differential gear 8 permitting the relative rotations of these shaft sections 7 in opposite directions, and through the sprocket chains and sprocket wheels before described, this relative opposite rotation will be transmitted to the shaft site sections 3 and the traction wheels so as to cause one driver or traction wheel to be turned in one direction while the other driver is moving in an opposite direction, making the turning point of the tractor the center of the driving action. With the right driving wheel, for instance, turning forward and the left driving wheel turning backward, it will be obvious that the front end of the tractor will be swung around to the left. The caster wheel 4 will be swung to a 90° angle with the tractor frame and when the tractor has turned to any desired angle up to 360°, then by moving the lever 25, the double beveled gears 21 and 22 are shifted to a neutral position and turning movement is stopped. Then the power clutch 60 is once more thrown in and the tractor is driven in the usual manner.

When the tractor starts to move straight ahead, the forward caster wheel 4 will swing around underneath the frame to a position parallel to the longitudinal axis thereof and the operator will then push the rod 46 forward, forcing the latch into the coinciding perforations in the disks 37 and 38, locking these disks together, thus giving the operator steering control of the tractor through the tiller 41. The flexible connection 50 between the rods 45 and 46 is necessary in order that the locking mechanism will rotate with disk 38, and furthermore, the rods 45 and 46 should be mounted for sliding movement in guides or supports so as to permit a circular movement of the latching mechanism with the disk 38 under the action of the tiller 41.

It will be obvious that it would be practically impossible for the operator, without great effort, to rotate the caster wheel or steering wheel 4 from a position parallel to the longitudinal axis of the tractor through 90°, which would be necessary in order for the forward end of the tractor to turn upon a vertical axis extending through the rear axle. By releasing the tiller 41 from its engagement with the steering wheel or caster wheel 4, however, this wheel is caused to turn automatically to the position without effort on the part of the operator.

It will be noted from Fig. 4 that the disk 37 is provided with two perforations 43 disposed in diametrically opposite positions. This is in order to permit the tractor to back up. Under these circumstances, the plows are raised out of the ground and the traction gear reverses to drive the tractor backward. This will cause the caster wheel to swing around in front of the frame in a position opposite to that illustrated in Fig. 1. This brings the other hole in the disk 37 beneath the opening 43 in disk 38 and the latch is again engaged with the two disks, thus again putting the caster wheel under control of the operator so as to guide the machine. When ready again to make a forward movement with the tractor, the latch 42 is retracted from the opening 43, the traction gear is reversed, driving the machine forward, and this again causes the caster wheel 4 to turn around into its trailing position, and then again is locked by the latch 42 passing through the first named opening or perforation in the plate 38.

It will be understood that with this mechanism, the tractor is ordinarily driven and steered in the usual manner, but that when a short turn is to be made, then the mechanism is operated to release the caster wheel and permit it to swing freely and trail, and the power driven mechanism is put in use and the traction wheels are disconnected from the ordinary driving gears of the tractor. Of course, it is obvious that the power driven and steering mechanism might be used under any circumstances desired by the operator and no steering be done by the steering wheel 4.

It will likewise be seen that the use of my mechanism entails no particular change in the tractor construction. The driving gearing of the tractor is not interfered with in any way by my mechanism. I am simply applying power through this mechanism to the shaft on which the ordinary differential gearing is mounted. I do not wish to be limited to any particular train of gearing for transmitting power from the shaft 15 to the traction wheels, nor do I wish to be limited to the details of construction shown, as these may be modified in many ways without departing from the spirit of the invention. By means of this mechanism, the tractor may be turned very shortly and quickly, where a short turn would be impossible by the use of the ordinary steering mechanism. It will be understood, of course, that I have not attempted to illustrate gearing which is embodied in all tractors for securing forward and backward movement of the traction wheels under ordinary circumstances.

While I have illustrated beveled gear wheels 21, 22 and 29, I wish it understood that beveled traction wheels might be used in place of the beveled gear wheels, and I do not wish to be limited to the use of these beveled gear wheels.

I claim:—

1. A tractor having a pair of traction wheels, a motor, two power transmitting shafts, means for operatively connecting the motor to either one of said shafts, one of said shafts having means operated thereby and operatively connected to both of the tractor wheels to drive them in the same direction, means actuated by the other shaft and adapted to rotate the traction wheels in relatively opposite directions, and manually controlled means for controlling the direction of rotation of said wheels.

2. A tractor including a supporting frame, traction wheels mounted for independent movement and supporting the frame, a motor, gearing adapted to operatively connect the motor to both of said traction wheels to rotate both of said traction wheels in the same direction, means for disconnecting said gearing from the motor, a power transmission shaft, means for operatively engaging the power transmission shaft to the motor, a longitudinally movable member carried on the power transmission shaft and rotatable therewith, oppositely disposed beveled gear wheels mounted upon said member and facing each other, a pair of independently rotatable beveled gear wheels mounted on each side of the transmission shaft and having a diameter less than the distance between the first named beveled gear wheels, manually controlled means for shifting said member to carry either one of the first named beveled gear wheels into engagement with the second named beveled gear wheels to thereby drive the second named gear wheels in opposite directions, and an operative connection between the second named gear wheels and the traction wheels.

3. A tractor including a supporting frame, a pair of traction wheels, shaft sections mounted on the frame and extending each from one of the traction wheels, means for transmitting power to the traction wheels including a differential gear for each of said shaft sections, a motor mounted on the frame, manually controlled means for connecting the motor to or disconnecting it from the differential gear, a pair of shaft sections disposed in alinement with each other and operatively connected to the first named shaft sections and carrying confronting beveled gear wheels, a power transmission shaft extending between said beveled gear wheels, a sleeve thereon rotating therewith and slidable therealong, oppositely disposed beveled gear wheels carried by said sleeve, manually controlled means for shifting the sleeve to carry either one of its beveled gear wheels into engagement with both of the first named beveled gear wheels, and manually controlled means for connecting said power transmitting shaft to the motor.

In testimony whereof I hereunto affix my signature in the presence of two witnesses.

NELSON WARE.

Witnesses:
Geo. S. Rix,
Walter Kyrk.